(12) United States Patent
Tiemann

(10) Patent No.: US 6,279,467 B1
(45) Date of Patent: Aug. 28, 2001

(54) EXPANDABLE COOLING RACK FOR FOODSTUFFS

(75) Inventor: Frank Tiemann, Braham, MN (US)

(73) Assignee: T & L Nifty Products, Inc., Braham, MN (US)

( * ) Notice: Subject to any disclaimer, the term of this patent is extended or adjusted under 35 U.S.C. 154(b) by 0 days.

(21) Appl. No.: 09/715,995

(22) Filed: Nov. 20, 2000

(51) Int. Cl.[7] .............................. A23L 1/00; A47J 37/00; A47J 37/04; A47J 43/00; A47J 43/18
(52) U.S. Cl. .............................. 99/426; 99/449; 99/450; 211/181.1
(58) Field of Search ..................... 99/426, 427, 444–450, 99/394; 16/262; 126/9 R, 25 R, 337 R, 339; 211/175, 153, 181.1, 49.1, 60.1; 248/166, 172; 294/1.1, 15, 152, 164, 169; D7/409, 566, 404

(56) References Cited

U.S. PATENT DOCUMENTS

| | | | |
|---|---|---|---|
| D. 321,804 | * 11/1991 | Wolff et al. | D7/404 |
| D. 368,186 | * 3/1996 | Tiemann | D6/566 X |
| 2,549,709 | * 4/1951 | Potts | 99/426 |
| 4,178,844 | * 12/1979 | Ward et al. | 99/449 |
| 4,191,160 | * 3/1980 | Elliott | 126/9 R |
| 4,458,585 | * 7/1984 | Erbach | 99/448 X |
| 4,481,874 | * 11/1984 | Greck | 211/181.1 |
| 4,633,773 | * 1/1987 | Jay | 99/426 |
| 5,103,799 | * 4/1992 | Atanasio | 126/9 R |
| 5,421,246 | * 6/1995 | Tippmann et al. | 99/426 |
| 5,558,237 | * 9/1996 | Anconal | 99/426 |
| 5,560,286 | * 10/1996 | Fabrikant et al. | 99/426 |
| 5,638,742 | * 6/1997 | Kassaseya | 99/449 X |

* cited by examiner

Primary Examiner—Timothy F. Simone
(74) Attorney, Agent, or Firm—James R. Cwayna

(57) ABSTRACT

An expandable rack for foodstuffs or other articles for temporary use after baking or cooking to allow the foodstuff to cool. The expandable rack consists of a plurality of tiers or layers which are slidably arranged with respect to one another such that the entire rack may be slid together to form a compact size for storage. A first layer or tier consists of a plurality of spaced, longitudinally extending rods surrounded by a continuous, formed member, to substantially provide a rectangular shape and having downwardly depending legs to elevate the same above a support surface. Each of the additional layers employs the same construction but is of reduced size to permit all layers to be slid together in underlying relation to the first layer. The structure for retaining the tiers or layers to one another and allow sliding therebetween is incorporated into each of the tiers and each tier has support legs.

8 Claims, 2 Drawing Sheets

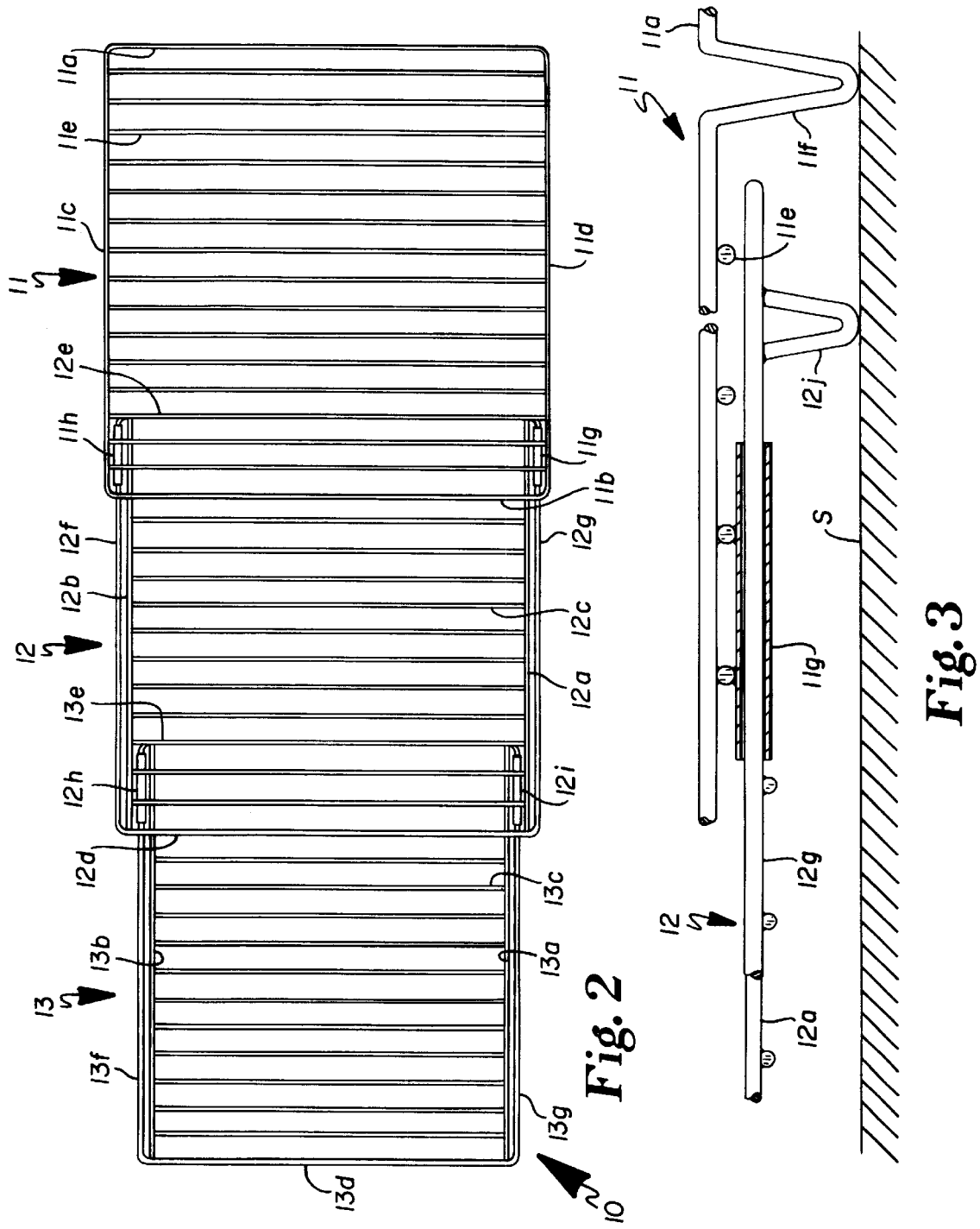

EXPANDABLE COOLING RACK FOR FOODSTUFFS

RELATED APPLICATIONS

Applicant has no and is not aware of any applications currently on file by others which relate to the subject matter of this application nor which should be considered during the prosecution of the same.

SPONSORSHIP

This invention is through the sole efforts of the Applicant and has not been sponsored by any Federal, Independent nor Commercial entities.

PRIOR ART

The pertinent prior art of which Applicant is aware is disclosed on the accompanying Information Disclosure Statement or its equivalent.

SHORT SUMMARY OF THE INVENTION

A rack for the cooling of various foodstuffs which includes a multi-tiered or layered rack structure wherein the tiers or layers slide relative to one another to provide a compact unit for storage but which expands in at least one dimension to substantially enlarge the supporting area of the unit.

The individual tiers each provide a plurality of spaced article support bars bounded by a surrounding bar or rod. A slide or interconnect arrangement is provided for linking the tiers into a contiguous unit and each of the individual tiers is provided with legs for supporting the entire unit in elevated position upon a surface. The slides allow for either limited or fill expansion of the individual tiers and the number of such tiers is selectable.

BACKGROUND AND OBJECTS OF THE INVENTION

Utilization of cooling devices such as racks for cooling of, particularly baked articles such as cakes, pastries, cookies and pies is well known in the art. Often, the person cooking the same will have such cooling racks at hand or will remove racks from the oven and place the articles thereon Often too, the person cooking will have racks that are simply devoted for the cooling of such articles. These racks are, very often, of limited size and present a storage problem when they are not in use. The structure of such racks is commonly a plurality of spaced bars upon which the food article is placed when removed from the cooking sheet or the like or a simple air passing support structure.

Applicant's invention provides an expandable rack which may find it's greatest use for cooling, that consists of at least two support racks which are slidably connected to allow expansion for use or collapsing thereof for storage.

Each of the racks provides legs for placing the entire unit on a support surface to maintain the upper or supporting surface of the rack in a relatively level position.

The sliding connection between racks allows a simple method of expanding the same to a desired length and for collapsing the same by sliding the racks together for a compact storage arrangement. The rack is also useable without expanding the same.

It is therefore an object of the Applicant's invention to provide an expandable rack for supporting various articles and which is particularly directed to supporting foodstuff, after cooking and during cooling thereof It is a further object of the Applicant's invention to provide an expanding rack structure wherein each of at least two tiers of a rack are provided and each tier consists of a plurality of spaced support bars with certain of or additional such bars being provided to provide a sliding connection between such tiers.

These and other objects and advantages of the Applicant's invention will more fully appear from the accompanying drawings and description of a preferred form of the invention

SHORT DESCRIPTION OF THE DRAWINGS

FIG. 2 is a top, plan view of the expandable rack in fully open position; and,

FIG. 3 is a side elevation of two tiers of the rack, drawn to an enlarged scale, particularly illustrating the slidable connection, which is provided between all tiers, with the upper tier being foreshortened and the underlying tier being terminated at a selected point which allows for viewing of the sliding connection between tiers.

DESCRIPTION OF A PREFERRED FORM OF THE INVENTION

Figure 1:
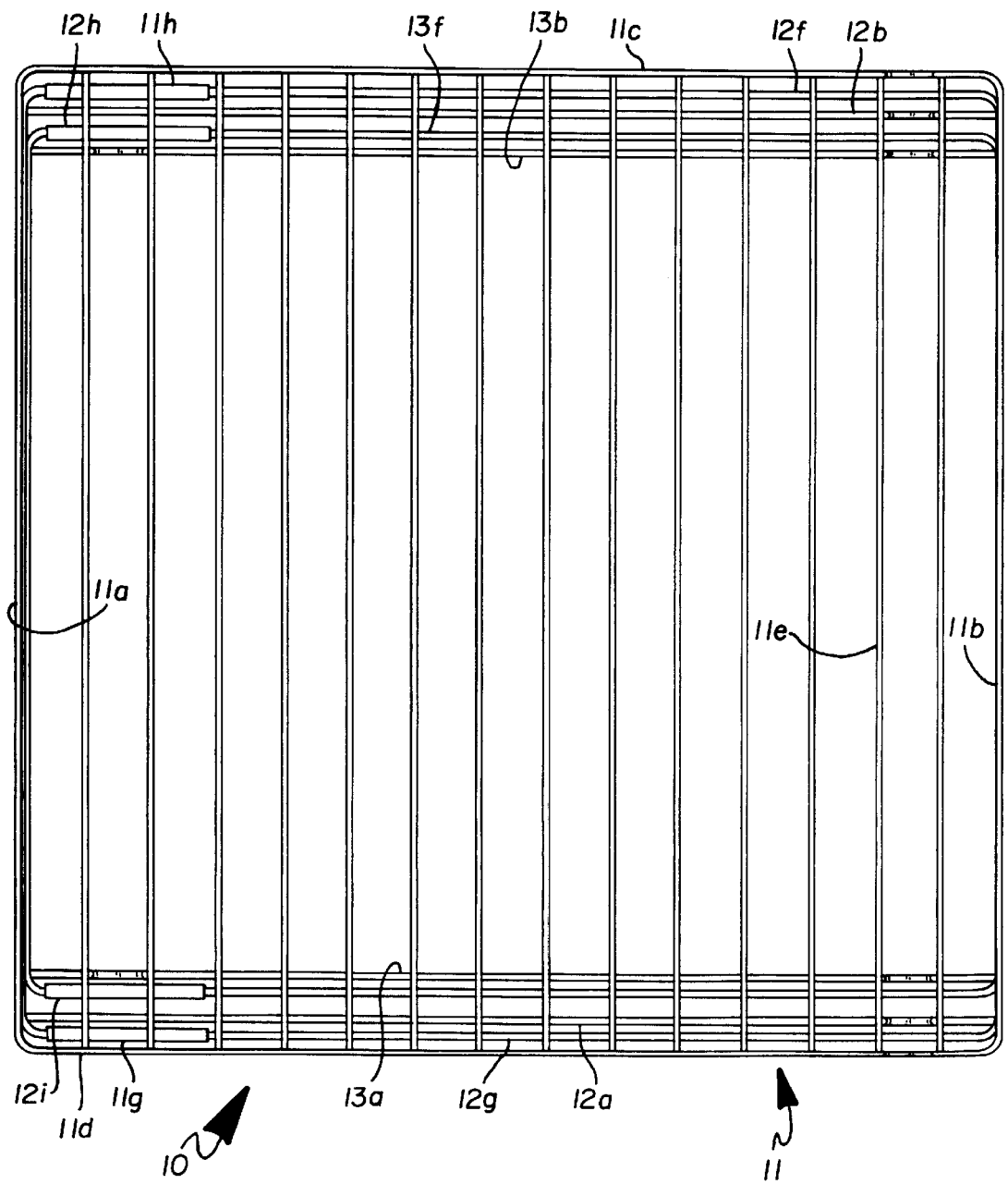
FIG. 1 is a top view of the expandable rack embodying the concepts of the Applicant's invention and illustrating the same in closed position.

In accordance with the accompanying drawings, the entire expandable rack is generally designated 10 and, in the form shown, consists of an upper 11, intermediate 12 and lower 13 rack section. Applicant has chosen a three tiered rack to illustrate his invention but it should be obvious that the invention is applicable to a rack of two or more tiers. It should also be obvious that although Applicant has selected the title "Expandable Cooling Rack for Foodstuffs" that the invention is an expandable rack which could support a variety of articles.

Description of a Preferred Form of the Invention

In accordance with the accompanying drawings, the expandable rack embodying the concepts of the Applicant's invention is designated in its entirety 10 and for illustrating the invention a rack embodying three tiers selected but it should be obvious that the aspects of the invention may be applied to racks of various tier numbers.

In the following description due to identical vertical location of the various elements from which the rack is constructed, a minimal amount of identifying indicia has been placed on FIG. 1 as total use of the designations from tier to tier of the unit would provide a view that would be difficult to interpret.

The rack 10, in the form shown, includes an upper tier 11, a middle tier 12 and a lower tier 13 with slide connection retaining means on the upper tier 11 and the middle tier 12 such that the middle tier 12 may slide into a position below the upper tier 11 and the lower tier 13 may slide into a position either solely under the middle tier 12 or under the combined upper 11 and middle tier 12.

The upper tier 11 includes a supporting outer member having ends 11a, 11b and sides 11c, 11d with a plurality of spaced, article supporting cross members 11e extending between and connected to the sides 11c, 11d. The sides 11c, 11d are formed into a substantial V-shaped, downwardly directed leg 11f adjacent one end 11a. The particular shape of this leg 11f is not essential to the invention and many other shapes could be utilized to function as a device to elevate the rack 10 above a supporting surface S, such as a kitchen counter for cooling air flow thereunder.

Located adjacent to the opposite end 11b, parallel to sides 11c, 11d and secured to at least one of the cross members 11e of tier 11 are a pair of female slide elements 11g, 11h. As illustrated in FIG. 3, these slide components 11g, 11h are in the form of elongated tubular members. A tubular configuration is chosen to afford longitudinal alignment of middle tier 12 with respect to upper tier 11. Obviously such alignment may be obtained with other shapes and configurations other than a tube.

Middle tier 12 and lower tier 13 are, basically of an identical construction to each other and differ slightly from the construction of tier 11 and decrease in width therefrom. As illustrated in FIG. 2, tier 11 has a first width while middle tier 12 decreases slightly in width therefrom and lower tier 13 decreases still further. This decreasing is obviously to allow the lower 13 and middle tier 12 to ultimately be slid under the upper tier 11 to provide the compact, storable unit.

Both middle tier 12 and lower tier 13 provide a support surface including a pair of sides 12a, 12b, 13a, 13b to which a plurality of cross members 12c, 13c are secured. These surfaces are bounded by a primary support element which includes ends 12d, 12e, 13d, 13e and sides 12f, 12g, 13f, 13g. It should be noted then that this double side arrangement allows a sliding clearance gap for the connective members as the connective members which are provided on tier 11 and tier 12 are arranged to receive the sides 12f, 12g, 13f, 13g of the tiers 12, 13 respectively.

As Applicant only illustrates a three tiered rack with the connective element 11g, 11h having been previously described, it is only necessary to provide the female connective elements 12h, 12i adjacent the respective end 12d of middle tier 12. Obviously, if additional tiers were provided, this sliding construction would be provided on succeeding tiers.

As illustrated in FIG. 3, each of tiers 12 and 13, although only a portion of tier 12 is illustrated therein, will be provided with downwardly directed leg units, such leg being designated 12j. Lower tier 13, though not illustrated, will provide such downwardly directed legs on both ends thereof as the leg provided adjacent end 13e is required to provide support for the extending end of tier 12.

It should be noted, that as the successive tiers 12 and 13 will ultimately underlie tier 11 and tier 13 underlies tier 12, as shown in FIG. 2, the height or length of such legs will be reduced from the length of leg 11f underlying tier 11 as ll of the provided tiers should be parallel to the supporting surface S when in extended position.

It should also be obvious that the width of each tier, from upper to lower, will decrease in width but this minimal width decrease will more than compensate for the expanded area provided by this single unit when the required storage area for the same is compared to separate racks.

It should be obvious that Applicant has provided a new and unique cooling rack which incorporates expanding article cooling areas and collapsible abilities for storage of the same.

What is claimed is:

1. An expandable rack for supporting articles thereon including:
   a. a first tier having sides and ends;
   b. a plurality of cross bars extending between said sides for support of articles on the upper surface thereof;
   c. a first slide component secured to said upper tier;
   d. at least one additional tier having sides and ends with cross bars extending between said sides for support of articles on the upper surface thereof; and,
   e. said additional tier having a second slide component secured thereto whereby said additional tier may be slid into underlying position with respect to said first tier.

2. The expandable rack as set forth in claim 1 wherein:
   a. said first slide component is secured to the under side of said first tier; and,
   b. said second slide component is provided by said sides of said additional tier.

3. The expandable rack as set forth in claim 1 wherein:
   a. said first tier is provided with a downwardly directed support leg; and,
   b. said additional tier is provided with a downwardly directed support leg.

4. The expandable rack as set forth in claim 3 and said downwardly directed support leg of said additional tier is of lesser length than said downwardly directed support leg of said first tier whereby the support surfaces thereof will be parallel to one another when the rack is placed on a supporting surface.

5. The expandable rack as set forth in claim 1 wherein:
   a. said first slide component includes a generally tubular, longitudinally extending, female member; and,
   b. said second slide component is provided by said side of said additional tier.

6. The expandable rack as set forth in claim 1 and:
   a. a slide component adjacent the end of said additional tier; and,
   b. a second additional tier having sides and ends with cross bars extending between the sides for support of articles; and
   c. said second additional tier having a second slide component cooperatively associatted with said slide component of said additional tier for sliding said second additional tier below said additional tier.

7. The expandable rack as set forth in claim 5 and:
   a. said additional tier is provided with a downwardly directed support leg; and,
   b. said second additional tier provided with a downwardly directed support leg.

8. The expandable rack as set forth in claim 6 wherein said leg of said second additional tier is of a lesser length than said downwardly directed support leg of said additional tier.

* * * * *